Figure 4:
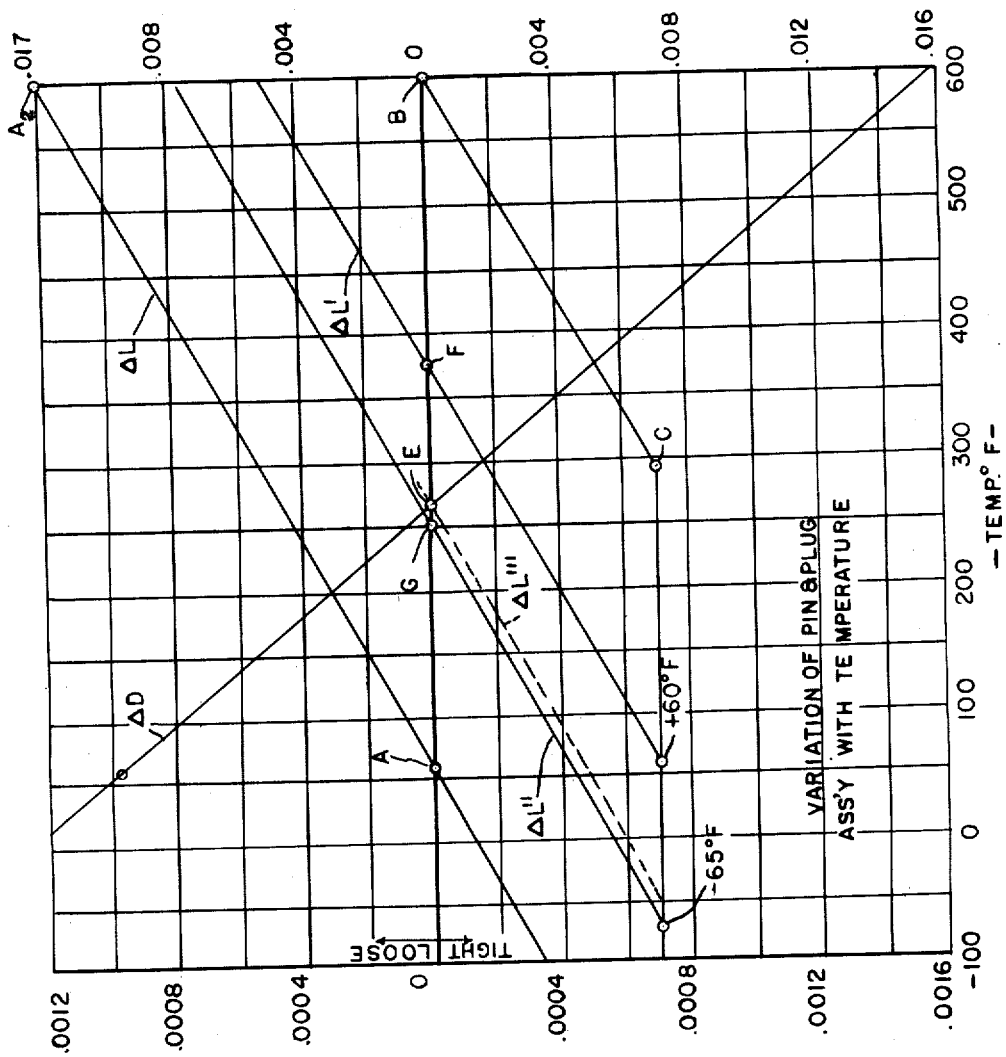

Sept. 17, 1957 E. GINN 2,806,752
AIRCRAFT ENGINE WRIST PIN
Filed July 25, 1955 2 Sheets-Sheet 1
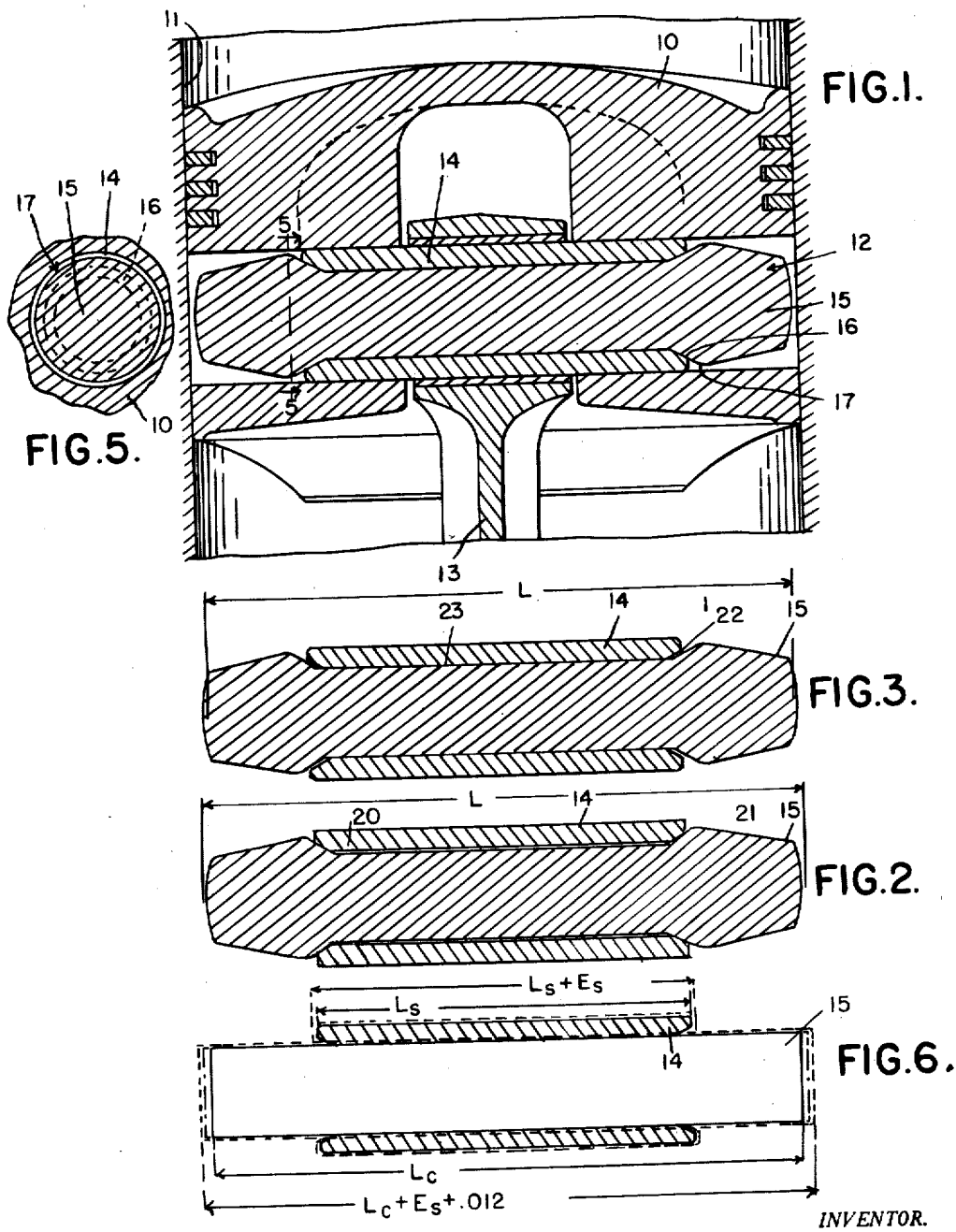
INVENTOR.
EARL GINN United States Patent Office 2,806,752
Patented Sept. 17, 1957

2,806,752

AIRCRAFT ENGINE WRIST PIN

Earl Ginn, Muskegon, Mich., assignor to Continental Motors Corporation, Muskegon, Mich., a corporation of Virginia Application July 25, 1955, Serial No. 524,160

11 Claims. (Cl. 309—19)

This invention relates to engine piston wrist pin assemblies or like article of manufacture and to a method or process of manufacturing such an article to maintain a tight fit between the parts through all engine operating conditions.

A piston pin assembly construction in common use today is that wherein a hard metal sleeve or tubular structure encases a somewhat longer plug or core of a softer material having less tendency to score the inner walls of the engine cylinders with which it may come in contact during engine operation.

Different methods have been devised for retaining the core within the sleeve, one effective method being to cold swage or cold stake the ends or portions of the ends of the core in such a manner that the core ends expand sufficiently on the sleeve end to retain the core therein. It has heretofore been believed that the core, having a higher coefficient of thermal expansion than the sleeve, would tend to expand and maintain a tight fit within the sleeve at higher engine operating temperatures. It has also been suggested that by applying inwardly directed pressure on the core, the expansive strain on the sleeve would induce a closer approximation of thermal expansion between the two parts, hence maintaining a tight fit.

Although these methods of fabrication have been found generally satisfactory, the industry still encounters cases of piston pin assembly failure. The core of the pin was found to be loose and elongated within the sleeve, and the core ends were battered and spread, having scored the cylinder walls.

The tendency of the pin to spin when the ends contact the cylinder causes a wear of the core, the sleeve, the bearing, and other parts. In addition, the elongation of the core and the spreading of the core ends results in its jamming inside the cylinder.

Tests by the applicant have uncovered reasons for this failure of a piston pin assembly. Since the core has a higher coefficient of thermal expansion than the sleeve, high operating temperatures cause the resultant interference on the diameter of the core with the sleeve to be translated into a permanent elongation or forging out of the material of the core, causing looseness between the staked ends. This condition occurs at a critical temperature range of approximately 500 to 600 degrees Fahrenheit. At subsequent lower temperatures, the core becomes loose on the diameter due to contraction, and at further lower temperatures, longitudinal contraction further stretches the core between the staked ends. Additional heating and cooling cycles increase this forging out, until a stable condition is reached.

By now, the clearance between the core and the cylinder walls is gone, the core is permanently loose, both on the diameter and between the stakes, and results in the damage referred to above.

Therefore, an object of the present invention is to prevent piston pin assembly failure by providing a novel construction involving a process of manufacture producing a sleeve and a core which will have a tight fit over all experienced operating temperatures.

Another object of the invention is to eliminate all tendency of the parts of a piston pin or like article of manufacture to become loose when subjected to varying temperatures by suitably affixing the ends of the parts at a predetermined temperature, such that the forging out between the parts has already occurred.

A further object of this invention is to prevent the elongation of the core of a piston pin assembly by removing the tendency to elongation of the core and machining its ends to required length prior to assembly in the piston.

For a more detailed understanding of the invention, reference may be had to the accompanying drawing illustrating a preferred embodiment of the invention, wherein like parts are referred to by like characters throughout the several views, and in which—

Fig. 1 is a vertical sectional view through an engine piston, showing a type of wrist pin construction in which the ends of the core are circumferentially swaged or staked onto the internally chamfered ends of the sleeve, Figs. 2 and 3 are diagrammatic sectional views through the piston pin assembly and suitably exaggerated to illustrate the fit at extreme temperatures, Fig. 4 is a graphic depiction of a piston pin assembly reaction during fabrication and after installation in an engine, Fig. 5 is a detail sectional view taken on the line 5—5 of Fig. 1 and Fig. 6 is a diagrammatic view illustrating a step in the process causing stretching of said core.

While the process of manufacture herein described is related to an engine piston pin of the type of construction shown, it is evident that other types of construction may be adaptable to this invention, and also that the process may be adapted to the manufacture of similar articles consisting of a sleeve and core structure, wherein the parts are of dissimilar material and a tight fit is desired throughout a range of temperature to which said article may be subjected.

Referring in more detail to the particular adaptation of the process as herein embodied, reference to Fig. 1 shows a piston 10 of an internal combustion engine reciprocating in the conventional manner within a cylinder 11 and connected by a wrist pin structure 12 to a connecting rod 13 which may be connected in a conventional manner with a crank (not shown) of an engine or other power plant. The wrist pin assembly comprises a sleeve or tubular structure 14, within which is inserted a plug or core 15. The core 15 is formed from material having a higher coefficient of thermal expansion than the sleeve 14.

The ends of the sleeve 14 are suitably circumferentially champfered or countersunk as at 16. The ends of the core 15 are suitably formed or swaged, as is described herein, so that the core is of greater diameter on the ends at 17 than the internal diameter of the sleeve 14, and forms to the contour of the circumferential champfer 16 of the sleeve 14.

Referring now to Fig. 4, it will be seen how a piston pin assembly of this type is manufactured in order to maintain a tight fit of the core in the sleeve.

The horizontal scale of this chart covers a temperature range of —100° to 600° Fahrenheit. The interference between the core and sleeve is indicated by the vertical scale on the left from .0016 inch tight to .0012 inch loose on the diameter, and on the right from .016 inch tight to .012 inch loose on the length. Interference conditions, varying with temperature, are indicated within the chart, and are various designated by $\Delta D$ (change of interference on diameter) and ΔL, ΔL′, ΔL″, ΔL‴ (change of interference on length).

Generally, the process consists in heating the unswaged assembly to the maximum temperature, in this case about 600° F., to which the assembly may later be subjected, so that all the stretching caused by forging out on the diameter over and above the normal thermal elongation will have taken place. It has been determined that the critical temperature range at which this stretching occurs is approximately 500 to 600 degrees F. Up to this range, no appreciable stretching occurs on heating. Then the core 15 is swaged onto the sleeve 14 before the temperature of the assembly falls below a critical level, in this case 400° F., so that on subsequent cooling, the maximum allowable stretch or forging due to the greater contraction of the core than the sleeve will occur between the stakes.

In the chart, point A represents the piston pin assembly at room temperature at the initial substantial interference of zero, that is neither tight nor loose. The line ΔL from point A to point A₂, illustrates the increase in temperature to substantially the 600° F. maximum, the core at this point having lengthened .012 inch more than the sleeve has lengthened, said .012 inch relative elongation being the combination of a greater normal thermal expansion of the core than the sleeve and forging of the core occasioned by the restriction to normal expansion on the diameter by reason of the fact that said sleeve does not expand as much on the diameter as would the core, this restrictive force of the sleeve thus forming the core to further elongate.

The above is diagrammatically illustrated in Fig. 6, wherein $L_s$ is the sleeve length at A; $L_s + E_s$ is sleeve length at A₂; $L_c$ is core length at A and $L_c + E_s + .012$ is core length at A₂. The dotted lines about the periphery of the parts indicate the overall expansions of both diameters and length. The sleeve and core are held at this temperature of 600° F. for about one (1) hour so that the above forging operation is fully accomplished.

The next step in the process is to swage the core onto the sleeve.

Assuming that the swaging or staking operation is performed at this 600° F. temperature, point B now denotes the new reference point wherein the core is neither too tight nor too loose within the sleeve; i. e. the core is swaged to fit the sleeve. From point B to point C, the assembly will contract normally due to cooling from 600° F. to approximately 280° F., both the sleeve and core shrinking in length and diameter. At point C the core has reached a point at which further cooling will produce the maximum elongation between the stakes that the core can withstand. This is determined by use of equation $$e \leq S_y \cdot \frac{L}{E}$$

where $e$ denotes elongation, $S_y$ is the yield strength at the incident temperature, L is the length of the core between the stakes, and E is the modulus of elasticity of the material, the equation then determining the elongation that the core can withstand at various temperatures at yield stress. This stretch is mainained as the assembly cools to room temperature of about 60° F., represented by the line from point C to point D.

As the line ΔL indicated the change in elongation between the core and sleeve before staking, the line ΔL′ rising to the right from point D indicates the change in elongation due to the temperature increase of the assembly if it is installed in an engine and put into use, provided the assembly has not been subjected to temperatures below 60° F. Likewise the line ΔL″ shows the change in elongation between the core and sleeve if the assembly had been cooled to about −65° F. prior to use, the cooling having caused some additional yielding on the length of the core.

Assuming that the core is .001 inch loose on the diameter at room temperature of about 60° F., the line ΔD indicates the interference on the diameter at the various temperatures. Consequently, point E denotes the temperature at which the core begins to become tight on the diameter within the sleeve as the assembly is heated. Points F and G similarly denote the temperatures at which the core begins to become loose on the length between the stakes, depending on how low a temperature the assembly had previously been subjected to; i. e., respectively to room temperature or −65° F. Consequently, if the assembly is cooled to −65° F., there will result a temperature range of about 20° F. between points E and G where the core would be loose on the diameter somewhat under .0001 inch and on the length somewhat under .001 inch.

It can now be seen that the dash line ΔL‴ indicates that if the piston pin assembly is not cooled below approximately −50° F., a tight fit will constantly be maintained between the parts. That is, at temperatures of approximately −50° F. to 270° F., the core will be loose on the diameter but tight on the length between the staked ends. This condition is depicted in Fig. 2, showing an exaggerated looseness 20 on the diameter or clearance between the core 15 and the sleeve 14, but a tight longitudinal fit 21 at the swaged or staked ends. The dimension L indicated in Figs. 2 and 3 denotes the length of the assembly at the intermediate operating temperature of approximately 270° F. at which the core is tight both on the diameter and longitudinally.

At temperatures approximately 270° F. to 600° F., the core is loose on the length but tight on the diameter. This condition is shown by Fig. 3, where the looseness 22 or clearance at the staked ends is compensated for by the tight fit 23 on the diameter.

Since the engine in which this piston pin 12 is installed is not expected to be subjected to temperatures below −50° F., or above 600° F., the sleeve 14 and the core 15 will always have a tight fit. It is obvious that calculations determining the temperature of preheating, the temperature at swaging or staking, and the resultant changes in the condition of the assembly are dependent on the materials of the parts and their sizes. Different materials and/or sizes will produce a chart of characteristics differing from Fig. 4 in details but similar in principle.

In the installation of the piston pin assembly 12 in the piston 10 of this particular application, it is determined that the maximum allowable pin length at 600° F. is to be about five (5) inches. The elongation of the core due to .0016 inch interference on the diameter is calculated as $$\Delta L = 1\left(\frac{D^2 ab}{D^2 st} - 1\right) = .0127 \text{ inch}$$

The growth due to thermal expansion is $\Delta L' = \Delta T d l$, and the stretch in the core at 60° F. is $\Delta L'' = .007$ inch. Therefore, after heating and swaging, the pin assembly is cooled to room temperature (60° F.) and then machined to length $L = 5.00'' - \Delta L - \Delta L' + L'' =$ approximately 4.960 inches. This will assure a piston pin which will maintain the required clearance of the ends from the inside cylinder walls in operation, since all the elongation due to interference on the diameter at higher temperatures has already taken place.

While there is illustrated and described but one embodiment of this invention, it will be apparent to those skilled in the art to which this invention pertains that various modifications and changes may be made therein without departing from the spirit of the invention or from the scope of the appended claims.

I claim:

1. The process of making a new article of manufacture comprising a close fitting assembly of a tubular sleeve and a core having a higher coefficient of thermal expansion than said sleeve, consisting in heating the sleeve and core assembly to a temperature causing the core to stretch beyond the normal thermal elongation of said core by reason of the forging action of said sleeve on said core and the swaging of both ends of the core on said sleeve while so heated.

2. The process of making a new article of manufacture comprising a close fitting assembly of a tubular sleeve and a core having a higher coefficient of thermal expansion than said sleeve, consisting in heating the sleeve and core assembly to a temperature of about 600 degrees F. causing the core to stretch beyond the normal thermal elongation of said core by reason of the forging action of said sleeve on said core and the swaging of both ends of the core on said sleeve while so heated.

3. The process of making a new article of manufacture comprising a close fitting assembly of a tubular sleeve and a core having a higher coefficient of thermal expansion than said sleeve, consisting in heating the sleeve and core assembly to a temperature of about 600 degrees F. causing the core to stretch beyond the normal thermal elongation of said core by reason of the forging action of said sleeve on said core and the swaging of both ends of the core on said sleeve while so heated, and prior to any cooling off of said assembly below about 400 degrees F.

4. A process of making a new article of manufacture comprising a sleeve having a predetermined length and diameter and a core having a predetermined length greater than the sleeve length and diameter closely fitting the internal diameter of said sleeve, said core being of a material of higher coefficient of thermal expansion than said sleeve, said process consisting in heating the assembled sleeve and core to a high temperature sufficient to cause increase of length of said core beyond the normal thermal elongation of said core due to the forging action of said sleeve on said core and until a substantially stable condition of the core is achieved, in swaging the ends of said core on said sleeve at said high temperature, in cooling said article to a low temperature sufficient to cause an additional elongation of said core due to stretching between the swaged ends, whereby said core will fit tightly within said sleeve on the diameter in the higher operating temperature range and between the staked ends in the lower operating temperature range.

5. A process of making a new article of manufacture comprising a sleeve having a predetermined length and diameter and a core having a predetermined length greater than the length of the sleeve and diameter closely fitting the internal diameter of said sleeve, said core being of a material of higher coefficient of thermal expansion than said sleeve, said process consisting in heating the assembled sleeve and core to a high temperature sufficient to cause increase of length of said core beyond the normal thermal elongation of said core due to the contraction of said sleeve on said core and until a substantially stable condition of the core is achieved, in swaging the ends of said core on said sleeve at said high temperature, said swaging of the ends of said core resulting in a maximum allowable stretch between stakes when said article is subsequently cooled to a predetermined temperature not less than about —50 degrees F. whereby said core and sleeve will maintain a tight fit on the diameter in the higher operating temperature range and between the swaged ends in the lower operating temperature range.

6. A process of making an article of manufacture comprising a tubular structure and a core structure of predetermined length and diameter so that said core structure initially has a close fit within the tubular structure, said core structure having a higher coefficient of thermal expansion than the tubular structure, and adapted for operation within a predetermined range of temperature, said process consisting in affixing the end portions of said core structure to said tubular structure at a predetermined temperature at least as high as the highest temperature attained in the range of temperature aforesaid such that thermal expansion and contraction of said structure during operation in said range of the temperatures aforesaid will assure a tight fit of the core within the tubular structure by interference on the diameter in the higher range of temperature and between the affixed end portions in the lower range of temperature.

7. A process of making an article of manufacture comprising a tubular structure and a core structure of predetermined length and diameter within the tubular structure, said core structure having a higher coefficient of thermal expansion than the tubular structure, and adapted for operation within a predetermined range of temperature, said process consisting in affixing the end portions of said core structure to said tubular structure at a predetermined temperature at least as high as the highest temperature attained in the range of temperature aforesaid and before the temperature of the assembly falls below a predetermined temperature such that subsequent cooling of said assembly will permit a maximum allowable stretch of said core structure due to forging between the affixed ends, whereby said core will fit tightly on the diameter in the higher range of temperature and between the affixed end portions in the lower range of temperature.

8. A new article of manufacture comprising an assembly of a sleeve and a core of a material having a greater coefficient of thermal expansion than said sleeve, the ends of said core protruding beyond the ends of said sleeve and swaged to greater diameter than the inner diameter of said sleeve, said core so fitted within said sleeve that when subjected to a predetermined temperature said core is provided with a tight fit within the sleeve both on the diameter and between the ends, and when subjected to temperatures below said predetermined temperature, said core is provided with a loose fit in the sleeve on the diameter and a tight fit between the ends, and when subjected to temperatures above said predetermined temperature said core is provided with a tight fit in the sleeve on the diameter and a loose fit between the ends.

9. A new article of manufacture comprising an assembly of a sleeve and a core of a material having a greater coefficient of thermal expansion than said sleeve, the ends of said core protruding beyond the ends of said sleeve and swaged to greater diameter than the inner diameter of said sleeve, said core so fitted within said sleeve that when subjected to a temperature of about 270° F. said core is provided with a tight fit within the sleeve both on the diameter and between the ends, and when subjected to temperatures of about —50° to about 270° F. said core is provided with a loose fit in the sleeve on the diameter and a tight fit between the ends, and when subjected to temperatures of about 270° F., to about 600° F. said core is provided with a tight fit in the sleeve on the diameter and a loose fit between the ends.

10. A method of making a piston pin assembly of a sleeve and a core of a material having a greater coefficient of thermal expansion than said sleeve, consisting in heating the sleeve and core assembly prior to the hot end swaging of the ends of the core on said sleeve to a temperature causing said core to be stretched beyond the normal thermal elongation thereof, and in additionally stretching of said core on cooling of the assembly due to forging between the swaged ends.

11. An article of manufacture comprising an assembly of a sleeve and a core of a material having a greater coefficient of thermal expansion than the sleeve, the ends of the core protruding beyond the ends of the sleeve and being swaged to a greater diameter than the inner diameter of the sleeve, the assembly being characterized by a forged assembly of the core within the sleeve so that at a selected temperature the core is fitted tightly within the sleeve both on the diameter and between the ends, and when said assembly is subjected to temperatures below said selected temperature the thermal contraction rate of the core exceeds the thermal contraction rate of the sleeve to cause the core to fit tightly within the sleeve between the ends and loosely on the diameter, and when said assembly is subjected to temperatures above said selected temperature the thermal expansion rate of the core exceeds the thermal expansion rate of the sleeve to cause the core to fit tightly within the sleeve on the diameter and loosely between the ends.

References Cited in the file of this patent
UNITED STATES PATENTS

| | | |
|---|---|---|
| 1,670,564 | Breer | May 22, 1928 |
| 1,851,553 | Walker | Mar. 29, 1932 |
| 2,125,106 | Gehret | July 26, 1938 |

UNITED STATES PATENT OFFICE
Certificate of Correction

Patent No. 2,806,752 September 17, 1957

Earl Ginn

It is hereby certified that error appears in the printed specification of the above numbered patent requiring correction and that the said Letters Patent should read as corrected below.

Column 4, lines 50 to 52, the equation should read as shown below instead of as in the patent—

$$\Delta L = L_s\left(\frac{D_{av}^2}{D_{st}^2} - 1\right) = .0127 \text{ inch}$$

Signed and sealed this 5th day of August 1958.

[SEAL]

Attest:
KARL H. AXLINE,
*Attesting Officer.*

ROBERT C. WATSON,
*Commissioner of Patents.*